United States Patent Office 3,394,103
Patented July 23, 1968

3,394,103
STABILIZATION OF POLYMERS AND COPOLYMERS OF FORMALDEHYDE
Ferenc Szilagyi, Antony, France, assignor to Produits Chimiques Pechiney Saint-Gobain, Paris, France
No Drawing. Filed July 15, 1964, Ser. No. 382,953
Claims priority, application France, July 22, 1963, 942,171
1 Claim. (Cl. 260—45.9)

ABSTRACT OF THE DISCLOSURE

Polymers of formaldehyde are stabilized against heat and oxidation by semicarbazones. The loss of weight is substantially less than that of standard products under similar heating. Resistance to bending of pressed films is high.

This invention relates to the process of stabilizing polymers and copolymers of formaldehyde against heat and oxidation. The process is particularly suited to the stabilization of those compounds which are of high molecular weight, for example polymers of formaldehyde the molecular weight of which is above 10,000. The process is useful with all such polymers and copolymers but the special difficulty which attends the stabilization of the high polymers furnishes an especially valuable outlet for the process and it will be described in that connection.

It is known that to prevent the thermal degradation of high polymers of formaldehyde the terminal groups of the chains can be stabilized by esterification or etherification. Nevertheless, the polymers which contain such blocked terminal groups still have an unsatisfactory stability and, during the course of use, they have a tendency to depolymerize. Consequently, it has been proposed to prevent the depolymerization by adding inhibitors such as hydrazine derivatives, urea and thiourea, or polyamides.

The term polymers of formaldehyde as used herein includes the copolymers. The high polymers of formaldehyde are also sensitive to the effect of an oxidizing atmosphere and to inhibit such oxidation it has been proposed to incorporate antioxidants such as the secondary and tertiary aromatic amines, the hydrazides, or phenols.

It is an object of the present invention to stabilize polymers of formaldehyde, particularly high polymers, against heat and oxidation, and to provide new stable polymers without charging the mass with an antioxidant and a thermal stabilizer. Another object is to produce new and superior polymers of formaldehyde, the stability of which toward oxidation and heat is superior to the forms known to the prior art. The objects of the invention are accomplished generally speaking by a method of stabilizing a polymer of formaldehyde which comprises incorporating therein a semicarbazone having the formula

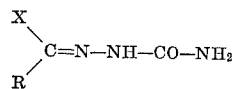

in which X comprises an aromatic nucleus of the benzene series and R is one of a group consisting of hydrogen, and an organic radical. The objects as to novel products are accomplished by a polymer of formaldehyde containing a stabilizing quantity of a semicarbazone.

The process of the invention is carried out by mixing with the polymer of formaldehyde, which may have either blocked or open terminal groups on the chains, one or more semicarbazones. The semicarbazones are condensation products of aldehydes or ketones with semicarbazide and they have the general formula

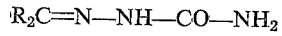

The general formula for these useful stabilizers is

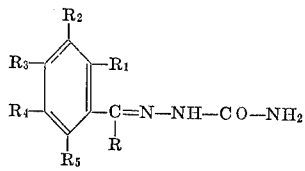

in which each of $R_1$ to $R_5$ is a substituent from a group consisting of hydrogen, alkyl, cycloalkyl, aryl, aralkyl, alkoxy, heterocyclic, hydroxy, $NO_2$, $NH_2$ and halogen, and R is one of a group consisting of hydrogen, alkyl, cycloalkyl, aryl, aralkyl and heterocyclic. Examples of the semicarbazones which are useful are the semicarbazones of salicylaldehyde, of 2,4 resorcinaldehyde, of 2,4 dinitrobenzaldehyde, of O-methoxybenzaldehyde, of 2,4 dimethoxybenzaldehyde, of para-toluene-benzaldehyde, of mesitaldehyde, of acetophenone, of phenyl n-propylketone, of O-methylacetophenone, of 2,4 dimethyl acetophenone, of phenyl-n-butylketone, of 5-nitrosalicylaldehyde, and of 3-methoxy, 5-nitrosalicylaldehyde.

The quantities of aromatic semicarbazone which may be usefully added to the polymers of formaldehyde to obtain a successful stabilization against heat and oxidation may lie between 0.01 and 10% by weight with respect to the weight of the polymer. It is advantageous cost wise to use as little as possible and satisfactory results are normally obtained between 0.1 and 3%. More than 10% may be employed without degradation of the polymer.

The incorporation of the stabilizer in the polymer can be carried out by any of the mixing techniques known to the art, those which permit a fine and regular dispersion of the stabilizer being preferred. Among the appropriate techniques is to mix finely divided stabilizer with finely divided polymer in a dry mixer, or on a roll mill, or to disperse it throughout molten polymer. It is also possible to dissolve the stabilizer in a volatile solvent, which is chemically inert to the polymer and the stabilizer, then to suspend the polymer in the solution and, after thorough mixing, to evaporate and recover the solvent. Solvents useful for this purpose are acetone, methanol, and ether. The addition of the novel stabilizer can be made to a polymer, the end groups of which have been esterified or etherified, or to a polymer whose end groups have not been thus blocked.

The following examples illustrate the invention without limiting the generality of what is elsewhere herein stated:

EXAMPLE 1

A dry mixer of standard type received 50 g. of acetylated polyoxymethylene powder and 0.05 g. of the semicarbazone of 2,4 resorcinaldehyde in a similar powder state. The product was removed from the mixer and 1 g. of it was heated in a stainless steel container under an atmosphere of nitrogen at 205° C., the temperature being maintained by an oil bath. After 15 minutes the temperature inside the container was 192° C., which was maintained for 30 minutes. The container was removed and cooled and the polymer was extracted. It was slightly yellowish. Its loss of weight was 1.6%.

The loss of weight measured in the same way using the same acetylated polymer without the stabilizer was 6%.

The same test was carried out on the stabilized, acetylated product in the absence of an atmosphere of nitrogen. The loss of weight was 1.6%, which demonstrates that the stabilized product is not affected by the action of oxygen.

Films were made from the polymer, after stabilization as aforesaid to a thickness of 0.05 to 0.2 mm., by pressing at 190° C. under 50 kg./cm.$^2$ pressure. These films were bent by standard bending tests over one hundred times on the same line without breaking.

EXAMPLE 2

In 200 cc. of acetone there were dissolved 0.05 g. of the semicarbazone of 2,4 dimethoxybenzaldehyde. 50 g. of acetylated polyoxymethylene were suspended in the solution and the acetone was removed by evaporation and recovered. 1 g. of the product was heated under the same conditions as in Example 1. The polymer remain colorless. The loss of weight of the stabilized polymer was 4.3% whereas the loss of weight was 6% for the unstabilized blocked polymer.

The loss of weight of the stabilized polymer heated without an atmosphere of nitrogen was the same as that in the presence of nitrogen. Films of the stabilized polymer from 0.05 to 0.2 mm. thick, produced as in Example 1, were bent over one hundred times on the same line without cracking.

EXAMPLE 3

Proceeding as in Example 1 but using 0.5 g. of the semicarbazone of salicylaldehyde as the stabilizer there was produced a stable polymer which was slightly yellow after heating and showed a loss of weight of 3% compared to the 6% of the unstabilized polymer.

EXAMPLE 4

Operating as in Example 1 but replacing the stabilizer with 0.5 g. of para-toluene benzaldehyde semicarbazone. The loss of weight of the stabilized polymers was 4% as against the 6% in the absence of the stabilizer. The films prepared as aforesaid withstood over one hundred bendings without breaking.

EXAMPLE 5

Proceeding as in Example 2 but using 0.5 g. of the semicarbazone of mesitaldehyde showed a loss of weight after heating under nitrogen of 5%. The stabilized films produced as in Example 1 withstood the same test.

EXAMPLE 6

The semicarbazone of phenyl n-butylketone, 0.5 g. being used, was mixed with 50 g. of molten acetylated polyformaldehyde, 1 g. of the stabilized product was heated as in Example 1, producing a yellowish polymer which showed a loss of weight of 4% compared to the 6% for the unstabilized acetylated polymer. The films produced as in Example 1 withstood the same test.

EXAMPLE 7

Example 1 was repeated with 50 g. of polyoxymethylene the terminal groups of which had been blocked by hydroxy-ethylation using ethylene oxide and 0.05 g. of 2,4 resorcinaldehyde semicarbazone. After heating the stabilized polymer was pale yellow and lost 4% of its weight. When the same test was carried out on the same polymer in the absence of the stabilizer, the loss of weight was 14%. Films prepared as in Example 1 withstood the same test.

EXAMPLE 8

Proceeding as in Example 1, 50 g. of a copolymer of formaldehyde-dioxolane 1,3, containing 1% of dioxolane 1,3, was intermittently mixed with 0.5 g. of 5 nitrosalicylaldehyde semicarbazone. 1 g. of the stabilized copolymer was heated as in Example 1 producing a pale yellow product with a loss of weight of 3.7%. When the same test was carried out without the stabilizer the loss was 7%. The bending test of Example 1 produced the same results.

EXAMPLE 9

Operating as in Example 8 but replacing the stabilizer with 0.05 g. of 3-methoxy, 5-nitro salicylaldehyde, semicarbazone, a stabilized copolymer was produced with a loss of 3.5% by weight compared to the 7% without stabilizer. The films were equally resistant to the bending tests.

The advantages of the invention are in producing stable polymers, including copolymers, of formaldehyde without using the antioxidants and stabilizers of the prior art. Another advantage is the production of stable high polymers of formaldehyde which are of good, light color or colorless and which have excellent physical and chemical properties. Another advantage is in improving the stability of polymers of formaldehyde. The invention is particularly applicable to the high polymers of formaldehyde but it may be usefully employed with the stabilization of the lower polymers. A particular advantage of the invention is in the production of stabilized polymers by a simple process which is readily carried out in standard machinery found in most plants and laboratories.

As many apparently widely different embodiments of the present invention may be made without departing from the spirit and scope thereof, it is to be understood that the invention is not limited to the specific embodiments.

What is claimed is:

1. A polymer of formaldehyde containing, and stabilized against heat and oxidation by, a stabilizing quantity of 2,4 resorcinaldehyde semicarbazone.

References Cited

UNITED STATES PATENTS

| | | | |
|---|---|---|---|
| 3,261,805 | 7/1966 | Griffiths et al. | 260—45.8 |
| 3,296,194 | 1/1967 | Wagner et al. | 260—45.9 |

DONALD E. CZAJA, *Primary Examiner.*

M. J. WELSH, *Assistant Examiner.*